Patented Aug. 6, 1929.

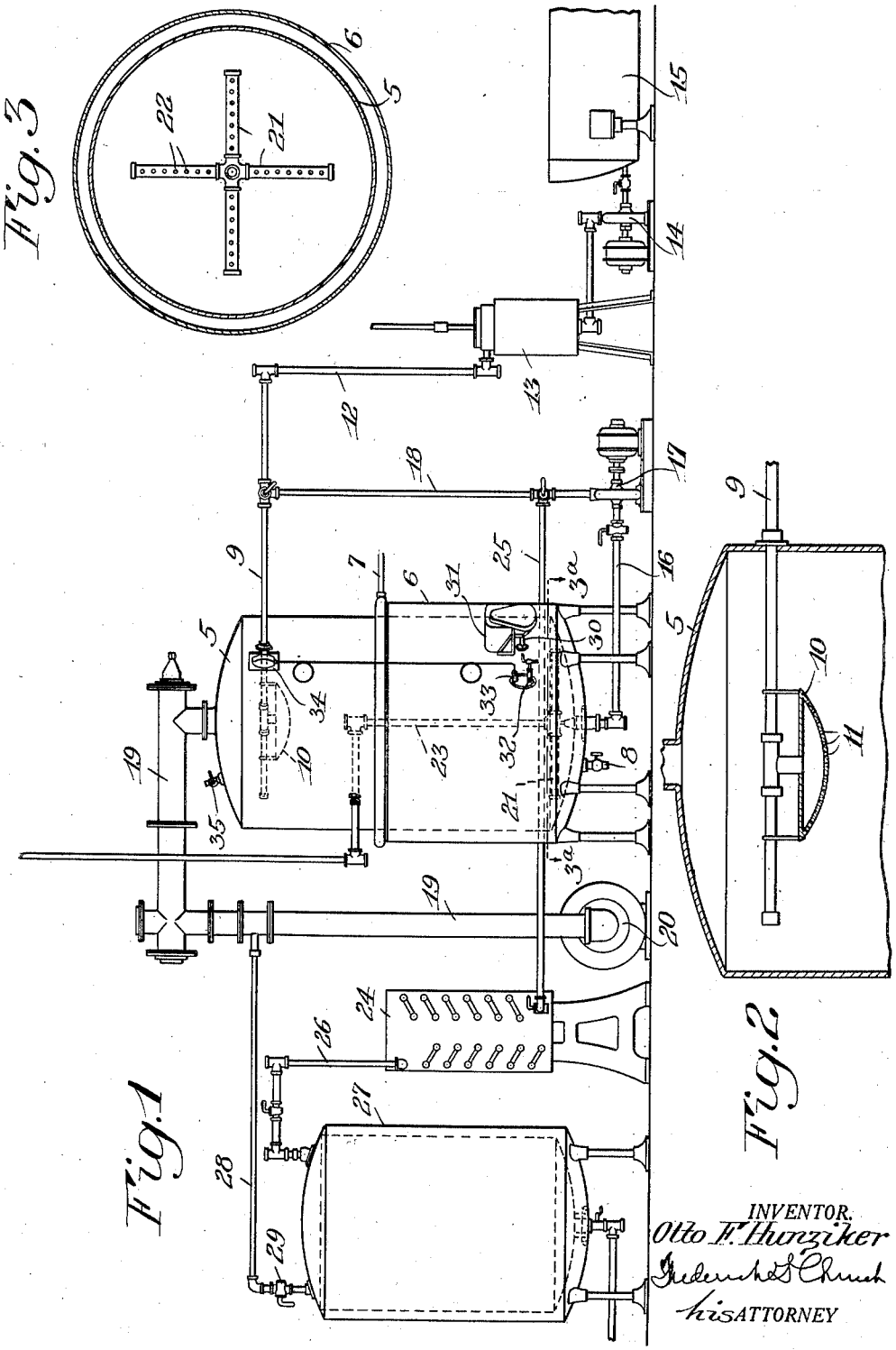

1,723,860

UNITED STATES PATENT OFFICE.

OTTO F. HUNZIKER, OF LA GRANGE, ILLINOIS, ASSIGNOR TO THE PFAUDLER COMPANY, OF ROCHESTER, NEW YORK, A CORPORATION OF NEW YORK.

PROCESS FOR TREATING MILK AND ITS PRODUCTS.

Application filed October 4, 1923. Serial No. 666,647.

This invention relates to processes and apparatus for removing from milk, cream and other liquids containing butterfat, objectional volatile flavors and odors such as are produced by wild onion, garlic, leek and the like, the chief object of the invention being to provide a process for accomplishing the above purpose efficiently and economically on a commercial scale without injuring the physical properties of the product.

To these and other ends the invention resides in certain improvements and combinations of parts all as will be hereinafter more fully described, the novel features being pointed out in the claims at the end of the specification.

In the drawings:

Fig. 1 is an elevation of an apparatus for carrying out the present invention.

Fig. 2 is an enlarged sectional elevation of the upper portion of a container included in said apparatus and showing a liquid spraying device and Fig. 3 is an enlarged sectional view on the line 3ª—3ª in Fig. 1 showing an air supplying means.

Similar reference numerals throughout the several views indicate the same parts.

The present invention comprises a process for treating milk and its products, for the purpose described, in which the liquid, after being standardized, if necessary, to a predetermined degree of acidity, is heated and subjected to the action of a partial vacuum, in a state of relatively fine subdivision and large surface exposure, and to the aerating action of a current of air which assists in removing the objectionable flavors and odors and is carried off by the vacuum producing means. I have disclosed herein one form of apparatus which may be employed for carrying out the invention, which will now be described.

Referring to the drawings, there is shown at 5 a closed container or vacuum pan, preferably constructed of glass lined steel, to withstand the pressure differences employed and to protect the product against the possible injurious effects of exposure to metal. Means are provided for heating or cooling the liquid contents of the container during the process, having the form, in the present instance, of an enclosing metal jacket 6, with a supply 7 at its top and a discharge pipe 8 at its bottom, for circulating in contact with the container wall a heating or cooling medium such as steam, hot or cold water, or brine, as more fully explained hereafter.

For the purpose of supplying the liquid to be treated to the container in a state of relatively fine subdivision affording a large surface exposure, there is provided a supply pipe 9 shown as entering the container horizontally adjacent its top and carrying in the latter a spraying device 10 of any suitable character, adapted to discharge the liquid into the container in the form of a spray. The spraying device 10 in this instance comprises a plate having a multiplicity of relatively fine jet openings 11, but it is to be understood that the essential function of this device is to break up the liquid into a spray, thin film, or other distributed form affording a large surface exposure, for which purpose the device 10 may have various modifications. Pipe 9 is connected as by means of a valved pipe 12 with a pasteurizer 13 through which the liquid is forced by means such as a pump 14 from a reservoir 15.

For treating liquid heavily charged with objectionable flavors and odors, it is desirable to circulate the same continuously and repeatedly through the spraying device and container 5, for which purpose there is connected with the bottom of the latter a pipe 16 leading to the intake of a suitable pump 17, the discharge of which is connected by pipe 18 with the pipe 9. There is thus provided a continuous closed system for withdrawing liquid from the bottom of the container and discharging the same into the container again in a state of relatively fine subdivision for the purpose of subjecting all portions of the liquid intensively to repeated treatment.

The means for maintaining a partial vacuum in container 5 comprises a pipe 19 connected adjacent its top and leading to the suction intake of a suitable pump 20, preferably of the wet vacuum type well known in the art and adapted to maintain a desired degree of vacuum in the container.

The purifying effect of spraying the liquid into a vacuum at a relatively high temperature is assisted by maintaining a current of air through the container in contact with the liquid and this is accomplished by locating in the container, preferably adjacent its bottom, an air supply means such as the branching pipe arms 21 provided with a multiplicity of fine jet openings 22 through which the air is discharged upwardly through the liquid in the bottom of the container and through the liquid spray descending from the subdividing device 10. The air is furnished to the supply means 21 by pipe 23 and is of course rapidly and continuously removed from the container after contact with the liquid by the vacuum producing means. The air supply may be heated by any suitable means if desired and for the same purpose pipe 23 is shown in the present instance as carried through the container 5 for a substantial distance on its way to the air discharge means 21.

After such treatment of the liquid in container 5 is finished, and the vacuum in the container relieved as hereafter described, the liquid is rapidly cooled as by means of a cooler 24 of any suitable variety preferably provided with coils for the circulation of cold water or brine or both as conditions may require. The cooler is supplied through a pipe 25 having a valve controlled connection with the discharge outlet of pump 17, as for example by connection with pipe 18. The discharge outlet of the cooler is connected by pipe 26 with a receptacle 27 for receiving the liquid and this receptacle has a connection 28 with the vacuum pipe 19 controlled by valve 29. The junction of pipes 9 and 18 and 18 and 25 are controlled by suitable valves as shown and it is apparent from the above construction that the liquid to be treated may be pumped by the means 14 or drawn by the vacuum from the pasteurizer into the container and may then be continuously and repeatedly circulated through the latter by the pump means 17. Also that the liquid after treatment may be forced by the pump means 17 or by a pressure difference created by drawing a vacuum or receptacle 27, from the container to the cooler 24 and into the receptacle.

The vacuum container is preferably equipped adjacent its bottom with an agitator of any suitable variety carried on and driven by a shaft 30 operated by connection with a suitable motor 31, as well understood in the art, for agitating the liquid in the container. The latter is also preferably equipped with a sampling cock 32 and with a fitting 33 for supporting in the container the bulb of a suitable thermometer device indicated generally at 34. At 35 in the top of the container is a cock for breaking the vacuum in the latter when desired.

My improved process which may be carried out by the above apparatus comprises, in the case of sour milk, cream or the like, first standardizing the same to a predetermined degree of acidity, by the addition of lime hydrate, sodium bicarbonate or other neutralizing agent, so that it will withstand all subsequent treatment without curdling in an abnormal manner as described also in my copending application for patent Ser. No. 487,912, filed July 27, 1921 for improved processes for deodorizing cream for butter making and the like. In the treatment of some products, however, such as sweet cream, this part of the process may be omitted. The vacuum pump 20 is then started and when the vacuum in container 5, as shown for example by a suitable gauge, reaches a degree of 20 inches or higher, the pasteurizer is put in operation and the liquid passed through the same into the vacuum container at a temperature of approximately 180° to 185° F. Simultaneously a slight current of air is supplied through the means 21 adjacent the bottom of the vacuum container. As the liquid enters the latter it is broken up into a state of relatively fine subdivision with large surface exposure, partly by the atomizing action of the reduced pressure and partly by passing through the perforations of the distributing plate from which it drops in the form of a fine shower. While the liquid is thus entering the container, the circulating pump 17 is started which results in the circulation of the liquid from the bottom of the container through the spraying device so that it is continuously and repeatedly subjected to the said atomizing action and to the action of the air current from the means 21.

After the entire batch of liquid to be treated has thus been drawn into the container, the recirculating operation is continued under the conditions described as long as the condition of the liquid may require. Sufficient air is supplied through the means 21 to contact with the exposed surface of the liquid and such air after contact is immediately and completely removed by the vacuum producing means or pump. During this treatment the temperature of the liquid is held at between 140° and 150° F. by circulating a heating medium such as steam or hot water through the container jacket. Such heating of the liquid during subjection, in a subdivided state, to the action of the vacuum and of the current of air, serves to facilitate the release and removal of objectionable flavors and odors. This operation is continued until samples of the liquid show that the objectionable taste and odor has been removed. In the case for example of cream having initially but a slight charge of off-flavors, these are removed substantially instantaneously upon discharge into the vacuum container and without recirculation, but in the case of cream strongly impregnated with an off-flavor or odor, a somewhat longer treatment is necessary, although the desired result may be completely attained in all cases in a period of twenty minutes or less. This short duration of treatment avoids all tendency to produce a mealy consistency in the product or otherwise injure its physical properties and market value.

At the end of this operation, the supply of air to the vacuum container is stopped, and the vacuum raised, while the liquid is still being circulated by the pump 17. This removes the air remaining in the liquid and helps to lower the temperature, which latter is further effected by circulating cold water through the container jacket. With the air thus removed and the temperature lowered to about 130° F. or below, the vacuum in the container is broken and a vacuum drawn on the receptacle 27. The agitator in the container is then started for the purpose of maintaining the liquid sufficiently agitated to prevent "oiling-off" of the butterfat and the liquid is by-passed by the means described to the cooler. The latter is preferably operated part with cold water and part with brine so that when the liquid reaches receptacle 27, it is near the desired temperature for churning of approximately 50° F. By this means the desired rapid cooling of the product to avoid "oiling-off" is readily accomplished.

The process described in my said copending application, while proven thoroughly practical and successful in commercial use, requires in some cases treatment extending over a substantial period of time and it has been found that considerable care must be exercised in such extended treatment to overcome a tendency in the case of a product, such as cream, for example, to acquire a disagreeable mealy texture depreciating its market value. The present invention is an improvement in the respect among others that it provides a process of an intensive character by which the desired result may be obtained in a comparatively short period of time, not exceeding twenty minutes, so that all danger of such injury to the quality of the product is obviated. The invention thus provides a thoroughly practical and efficient process which is economical in time and power or energy requirements and adapted for use in commercial operation on a large scale without tendency to in any way injure the physical properties of the product.

I claim as my invention:

1. The process of treating milk for the purpose described consisting in subjecting the milk in a state of subdivision to the action of a current of air in a partial vacuum.

2. The process of treating milk for the purpose described consisting in subjecting the milk in a state of subdivision to the action of a current of air in a partial vacuum and under the influence of heat.

3. The process of treating milk for the purpose described consisting in continuously circulating a batch of milk in a state of subdivision through a partial vacuum in a closed system and thereby subjecting all portions of the milk to repeated treatment.

4. The process of treating milk for the purpose described consisting in heating the milk and continuously and repeatedly circulating the same in a state of subdivision through a partial vacuum.

5. The process of treating milk for the purpose described consisting in heating the milk and continuously and repeatedly subjecting the same to aeration in a partial vacuum.

6. The process of treating milk for the purpose described consisting in continuously and repeatedly subjecting the milk in a state of subdivision to the action of a current of air in a partial vacuum.

7. The process of treating milk for the purpose described consisting in heating the milk and continuously and repeatedly subjecting the same in a state of subdivision to the action of a current of air in a partial vacuum.

8. The process of treating milk consisting in heating the milk to a relatively high temperature, repeatedly discharging all portions thereof in a state of relatively fine subdivision into a partial vacuum and maintaining a current of air through the milk in said vacuum, for removing undesirable flavors and odors.

9. The process of treating milk consisting in circulating the same at a high temperature and in a state of relatively fine subdivision through a partial vacuum, maintaining a current of air through the milk in said vacuum, and subsequently agitating and rapidly cooling the milk to churning temperature.

10. The process of treating milk consisting in standardizing the same to a predetermined degree of acidity, rapidly circulating the milk at a high temperature and in a state of relatively fine subdivision through a partial vacuum, and maintaining a current of air through the milk in said vacuum for removing undesirable flavors and odors.

11. The process of treating milk consisting in standardizing the same to a predetermined degree of acidity, rapidly circulating the milk continuously and repeatedly at a high temperature and in a state of relatively fine subdivision through a partial vacuum, maintaining a current of air through the milk in said vacuum for removing undesirable flavors and odors, and subsequently continuously agitating and cooling the milk to churning temperature.

OTTO F. HUNZIKER.